Jan. 9, 1934. J. IVEMEYER 1,943,271
BRAKE BEAM STRUT
Filed Feb. 16, 1933 3 Sheets-Sheet 2
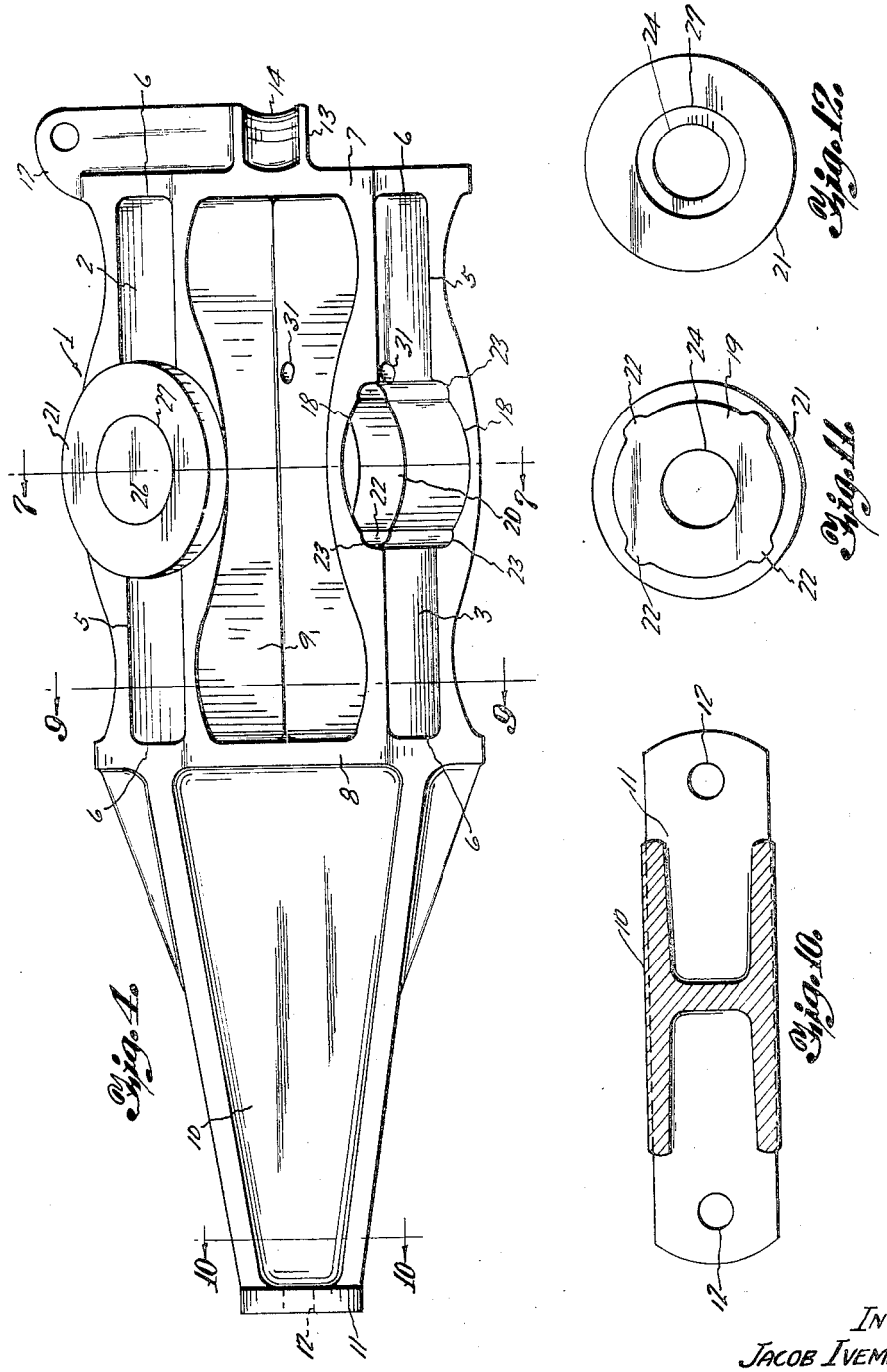
INVENTOR
JACOB IVEMEYER
By Adam E. Fisher
ATTORNEY Jan. 9, 1934.  J. IVEMEYER  1,943,271
BRAKE BEAM STRUT
Filed Feb. 16, 1933   3 Sheets-Sheet 3
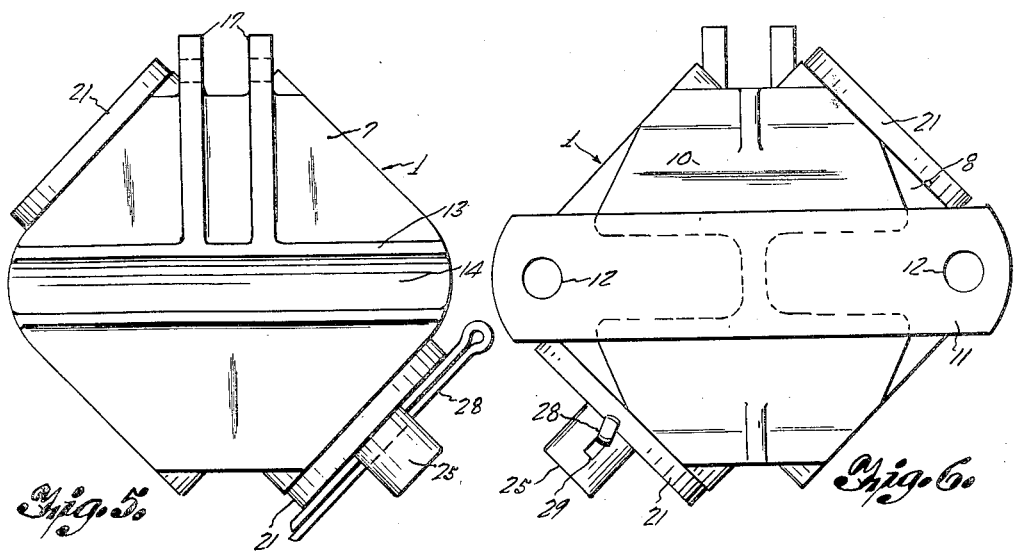
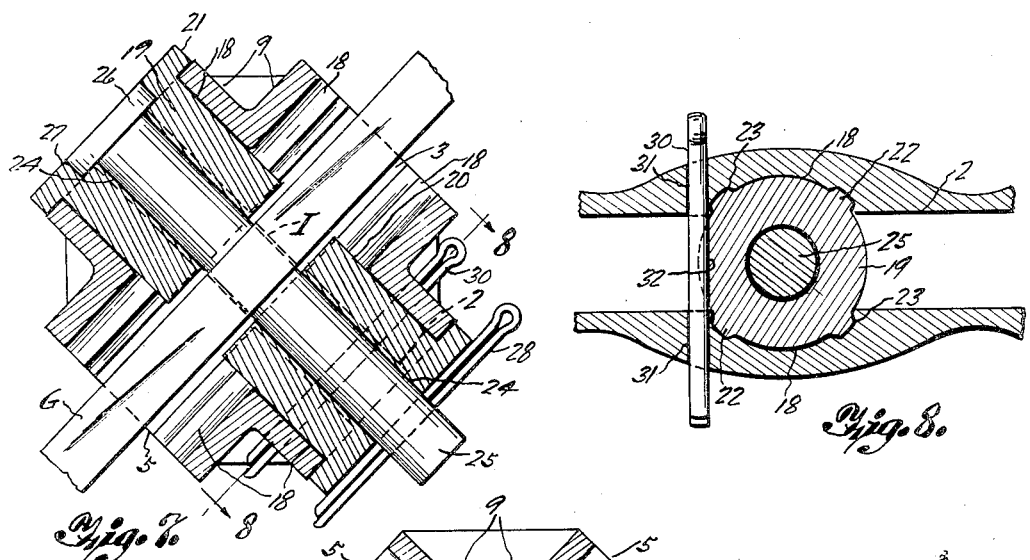
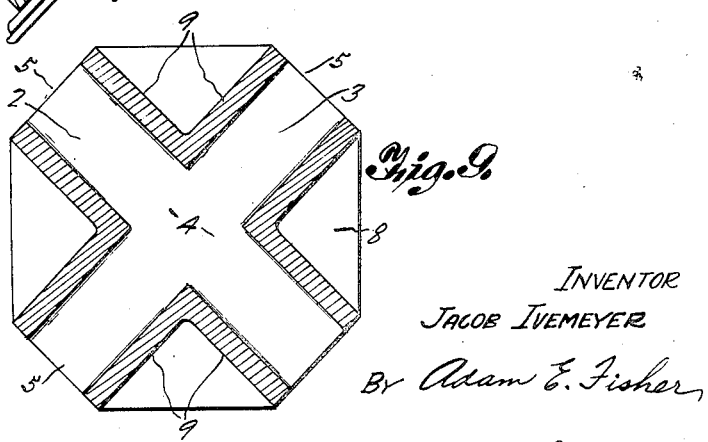
INVENTOR
JACOB IVEMEYER
By Adam E. Fisher
ATTORNEY Patented Jan. 9, 1934

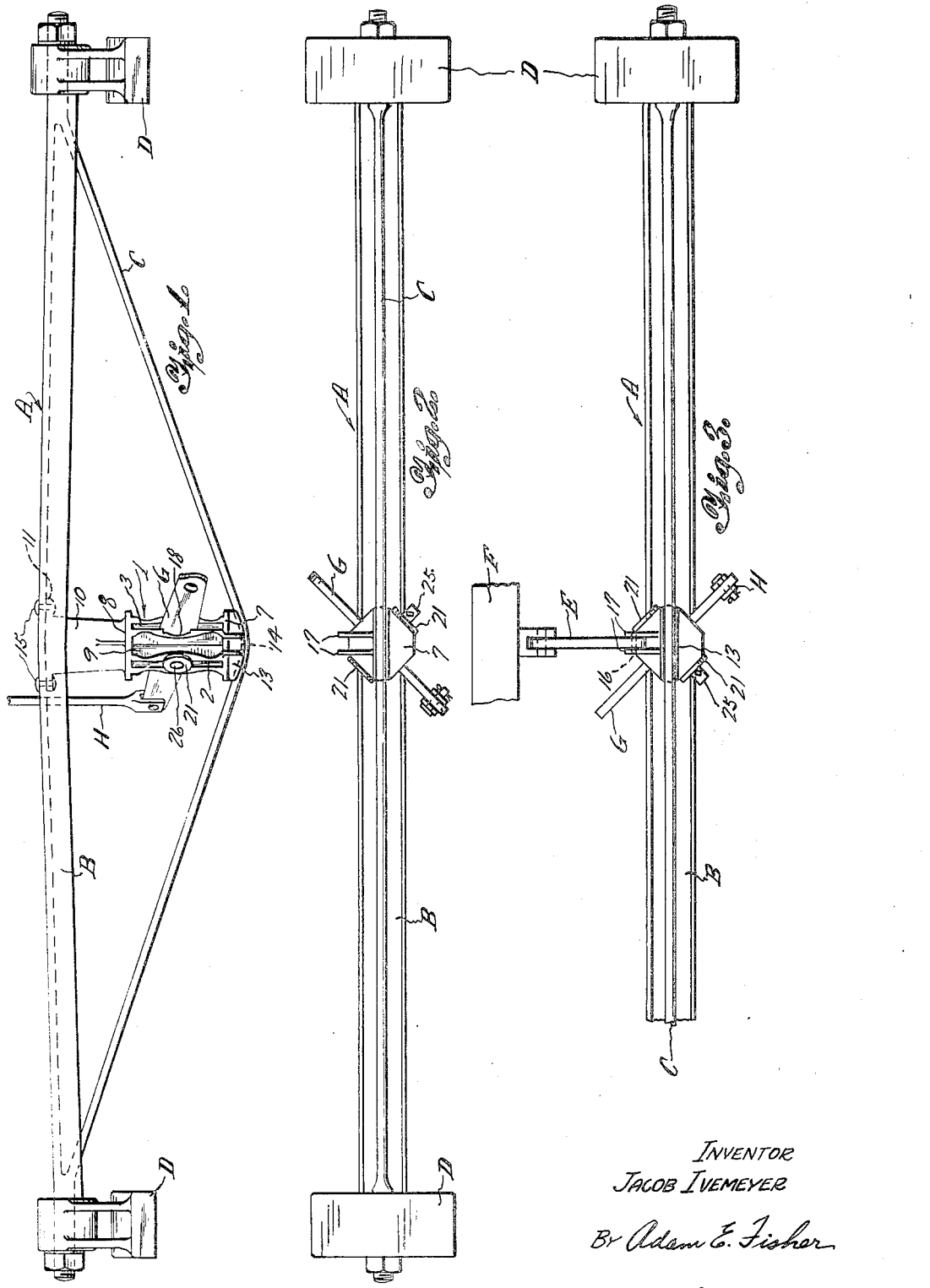

1,943,271

UNITED STATES PATENT OFFICE 1,943,271

BRAKE BEAM STRUT

Jacob Ivemeyer, Beardstown, Ill.

Application February 16, 1933. Serial No. 657,003

8 Claims. (Cl. 188—232)

My invention relates to improvements in brake beam struts for brake beam and shoe assemblies of railroad cars and engine tanks.

In these assemblies as mounted beneath a railroad car the several brake levers pivotally supported in the struts are arranged at opposite angles to the vertical and are known as right and left hand beams according to the angle at which the levers extend. The beams are not interchangeable for this reason and it is necessary that a stock of both right and left hand beams be kept for repair and replacement. In view of the foregoing it is the main object of my invention to provide an improved form of strut so arranged that the brake lever may be mounted therein at either a right or left hand angle thus making a beam equipped with my strut interchangeable and useable in any position.

Another object is to provide a strut of this kind including a body having means at either end for connection to a brake beam of any conventional form and having lever slots out through between its ends at equal opposite angles to the vertical to receive and hold a lever in either a right or left hand position, said slots having sockets at their outer margins to receive pivot pin cores whereby the pivot pin supporting the lever in either position is supported in and through the unused slot.

Another object is to provide a strut of this kind in a simple, durable and efficient form and in which the operation of reversing or arranging the brake lever at either a right or left hand angle may be easily and quickly performed.

The foregoing and other objects together with means whereby the same may be carried into effect will be readily understood from the following description of one practical and preferred embodiment of my invention taken in connection with the accompanying drawings wherein:

Figure 1 is a plan view of an assembly of a brake beam and shoes showing my improved strut in position and with the brake lever arranged at a left hand angle.

Figure 2 is a front view of the assembly of Figure 1.

Figure 3 is a view similar to Figure 2 but showing the brake lever in its right hand position, a safety hanger and associated parts being also shown in this view.

Figure 4 is a greatly enlarged side elevation of the strut, the brake lever being removed but the pivot pin therefor being shown in place as for supporting the lever in its left hand position.

Figure 5 is a front view of the strut as shown in Figure 4.

Figure 6 is a rear elevation.

Figure 7 is a vertical cross section along the line 7—7 in Figure 4.

Figure 8 is a section along the line 8—8 in Figure 7.

Figure 9 is a section along the line 9—9 in Figure 4.

Figure 10 is a section along the line 10—10 in Figure 4.

Figure 11 is an inner end view of one of the pivot pin core blocks or plugs.

Figure 12 is an outer end view of one of the pivot pin core blocks or plugs.

Referring now with greater particularity to the drawings the strut comprises a body portion block or casting 1 of suitable length and size through which right and left hand lever slots 2 and 3 are formed, the said slots extending at right angles and crossing each other whereby each equally bisects the other and forms a central intercommunicating passageway 4. The slots open at their outer sides at 5 through the face of the body portion and terminate at their ends 6 short of the ends of said body whereby solid front and rear ends 7 and 8 are provided therefor. Between the open outer sides of the slots 2 and 3 the body portion 1 is cut away in substantially V-shaped depressions 9 leaving web or rib-like walls for the said slots. A tail piece 10 of I or I-beam section is extended rearwardly from the body 1 and terminates at its rear end in a laterally extended foot or cross piece 11 pierced near its end with mounting holes 12. An arcuate rib or shoulder 13 is formed on and across the front end 7 of the body 1 and has its forward arcuate margin grooved or concaved as designated at 14. The strut as so far described is preferably and most efficiently cast from suitable material in a single piece and the various details of form and shape are carried out for the purpose of both lightening and strengthening the structure in accordance with conventional practice in this line.

The strut is adapted for connection to and use with a conventional form of brake beam as represented at A in Figures 1, 2 and 3, same comprising a channel shaped compression member B and forwardly bowed tension member C, the two being joined at their ends and arranged to support the brake shoes D. The strut is disposed centrally between the members B and C and the foot 11 of the tail piece is riveted at 15 through the holes 12 to the compression member while the rib 13 is forced in behind the tension member which then rests in the groove 14 forming a rigid and strong structure. The forward end of the strut and beam may be supported, if desired, by a safety hanger link E connected to the truck bolster of the railroad car or other overhead support F and pinned at 16 at its lower end between apertured ears 17 formed on the forward end 7 of the strut as shown.

In this normal position of the strut the lever slots 2 and 3 each lie at equal and opposite angles to the vertical whereby a conventional brake lever G inserted therethrough will assure a similar angle and whichever angle is proper for the position or location of the beam. The object of course of the lever G is to move the brake beam forward and bring the brake shoes D into contact with the car wheels (not shown) the lever being operated for this purpose by the brake rod or link H.

Intermediate their ends the lever slots 2 and 3 have shallow, concave or arcuate sockets 18 formed in alignment in their walls and extending from their outer open margins 5 inwardly to the passage 4. A pair of pivot pin core blocks or plugs 19 and 20 are provided and are adapted to slip inwardly into the sockets 18 in the slots 2 and 3 as shown, the said blocks having diametrically enlarged flat heads 21 overlying the outer margins of the sockets and slots to hold the blocks in place. The blocks are also locked against rotation in the sockets by means of radially spaced and longitudinally extending ribs 22 fitting into complementary grooves 23 formed in the sockets 18 near the margins thereof. Both blocks 19 and 20 have axially extended bores 24 adapted to receive a conventional pivot pin 25, the head 26 of which may lie in a diametrically enlarged recess 27 in the head 21 of one block as seen in Figure 4. The blocks 19 and 20 project a short distance into the passage 4 and beyond the plane of the lever slot in use by the lever as shown in Figure 7 whereby they form a bearing for the brake lever and may be driven or wedged out if they stick in their sockets.

In use the brake lever G is passed through either of the lever slots 2 or 3 and the core blocks 19 and 20 are then slipped inwardly into the sockets 18 in the unused slot and the pivot pin 25 is inserted through the bores 24 of the blocks and through the usual bearing aperture I in the brake lever. The lever is thus pivotally supported in the strut and may operate in usual manner to bring the brake shoes D into engagement with the car wheels. To change the "hand" or angle of the brake lever in the strut it is only necessary to remove the pivot pin and lever, place the lever in the other slot and then change the core blocks to the slot just used by the lever, this operation being quickly and conveniently performed as will be apparent.

The block as for instance 19, having the head recess 27 for the head of the pin 25 is placed in the upper side of the slot used and the pin is further held in place by a cotter key 28 passed through an aperture 29 adjacent the lower end of the pin. The lower core block 20 is prevented from falling out of its slot by means of a cotter key 30 passed through aligned apertures 31 in the walls of the slots near their lower sides, the said key projecting into a registering recess or groove 32 formed in one side of the block. The lower sides of both lever slots 2 and 3 are of course provided with the apertures 31 to accommodate the retaining key 30 in either position of the core block 20.

It is thought that further details of the use, operation and advantages of the strut will be apparent without further description at this point. It is understood that changes in the device may be made to adopt it for use with brake beams of any form or size and such changes are considered within the scope of the present invention.

While I have herein set forth a certain preferred embodiment of my invention it is understood that I may vary from the same in minor structural details so as best to construct a practical device for the purposes set forth, not departing from the spirit of the invention and within the scope of the appended claims.

I claim:

1. In a brake beam strut, a body portion having a pair of slots extending and crossing at right angles, the said slots having sockets at their outer sides, and pivot pin blocks adapted for removable mounting in the said sockets.

2. In a brake beam strut, a body portion having a pair of longitudinally extended slots cut at right angles and each bisecting the other, the said body portion having shallow sockets cut in the outer sides of the slots, and a pair of pivot pin core blocks removably mounted in the said sockets.

3. In a brake beam strut, a body portion having a pair of longitudinally extended slots cut at right angles and each bisecting the other, the said body portion having shallow sockets cut in the outer sides of the slots, and a pair of pivot pin core blocks removably mounted in the said sockets, and a pivot pin mounted in the said core blocks to support a brake lever in one of the slots.

4. In a brake beam strut, a body portion, means extended from the ends of the body portion to engage a brake beam, the said body portion having lever slots cut longitudinally and at right angles to each other whereby each crosses and bisects the other, the walls of the slots being cut away at aligned points forming shallow sockets, and pivot blocks adapted for insertion into any of the said aligned sockets, the said blocks having axially extended pivot pin receiving bores.

5. In a brake beam strut, a body portion, means extended from the ends of the body portion to engage a brake beam, the said body portion having lever slots cut longitudinally and at right angles to each other whereby each crosses and bisects the other, the walls of the slots being cut away at aligned points forming shallow sockets, and pivot blocks adapted for insertion into any of the said aligned sockets, the said blocks having axially extended pivot pin receiving bores, and means for securing the said blocks against removal from or rotation in the sockets.

6. In a brake beam strut, a body casting, a tail piece extended from one end of the body, an arcuately grooved rib formed on the other end of the body, the said body having longitudinally extended slots crossing each other at right angles, and core blocks adapted for insertion in the said slots, the said core blocks having axially extended bores to receive a pivot pin whereby a brake lever mounted in one slot may be pivotally supported by the core blocks in the other slot.

7. In a brake beam strut, a body portion having longitudinally extending slots crossing each other at right angles and opening at their outer sides through the said body, the walls of the slots being cut away at aligned medial points forming shallow concaved sockets, core blocks adapted for insertion in the said sockets, the said body portion having apertures extended at right angles to and through the slots adjacent the said sockets, one of the core blocks having a groove in one side adapted to register with the said apertures, and a keeper key adapted for insertion through the apertures and groove to hold the core block in place.

8. In a brake beam strut, a body portion having longitudinally extending slots crossing each other at right angles and opening at their outer sides through the said body, the walls of the slots being cut away at aligned medial points forming shallow concaved sockets, core blocks adapted for insertion in the said sockets, the said body portion having apertures extended at right angles to and through the slots adjacent the said sockets, one of the core blocks having a groove in one side adapted to register with the said apertures, and a keeper key adapted for insertion through the apertures and groove to hold the core block in place, the said core blocks having diametrically enlarged heads overlying the margins of the slots and having axially extended pivot pin bores.

JACOB IVEMEYER.